United States Patent [19]

MacDuff

[11] Patent Number: 4,591,368

[45] Date of Patent: May 27, 1986

[54] BUILT-IN VACUUM SYSTEM

[76] Inventor: James L. MacDuff, 1284 Montrose Ave., Victoria, B.C., V8T 2K6, Canada

[21] Appl. No.: 614,679

[22] Filed: May 29, 1984

[30] Foreign Application Priority Data

Apr. 27, 1984 [CA] Canada .................................. 453061

[51] Int. Cl.⁴ .............................................. B01D 25/02
[52] U.S. Cl. ........................................ 55/372; 55/378;
55/380; 55/419; 55/470; 55/472; 15/327 D
[58] Field of Search ................ 55/363, 367, 369–371,
55/372, 374, 378, 380, 381, 467, 470, 471, 472;
15/327 D, 327 E

[56] References Cited

U.S. PATENT DOCUMENTS

| | | | |
|---|---|---|---|
| 1,021,667 | 3/1912 | Duffie | 55/378 |
| 2,555,742 | 6/1951 | Grue | 55/374 |
| 2,719,596 | 10/1955 | Kent et al. | 55/380 |
| 3,023,447 | 3/1962 | Senne | 55/378 |
| 3,032,955 | 5/1962 | Burch | 55/472 |
| 3,046,718 | 7/1962 | Ide et al. | 55/470 |
| 3,142,857 | 8/1964 | Fresard et al. | 15/327 |
| 3,172,743 | 3/1965 | Kowalewski | 55/380 |
| 3,240,000 | 3/1966 | Hayes et al. | 55/472 |
| 3,568,413 | 3/1971 | Jerabek | 15/327 D |

FOREIGN PATENT DOCUMENTS

| | | | |
|---|---|---|---|
| 218854 | 11/1958 | Australia | 15/327 R |
| F14605 | 3/1956 | Fed. Rep. of Germany | 55/470 |
| 245148 | 4/1926 | United Kingdom | 15/327 D |
| 885423 | 12/1961 | United Kingdom | 55/367 |

*Primary Examiner*—Bernard Nozick
*Attorney, Agent, or Firm*—Spensley Horn Jubas & Lubitz

[57] ABSTRACT

A built-in vacuum system which has improved vacuum drawing capability, an improved filtering system, and an improved vacuum hook-up arrangement. The built-in vacuum apparatus comprises in combination: (a) a container having therein at least one vacuum inlet port and one vacuum outlet port; (b) means for drawing a vacuum upon the vacuum inlet port, and exhausting drawn air through the vacuum outlet port; and (c) a particle filtering medium which is so disposed within the container that none of the effective filtering surface of the filtering medium contacts the container when a vacuum is drawn upon the system by the vacuum drawing means. The apparatus includes removable air-tight vacuum inlet post fittings and detachable attachments for installing one or more vacuum drawing means in the apparatus.

13 Claims, 18 Drawing Figures

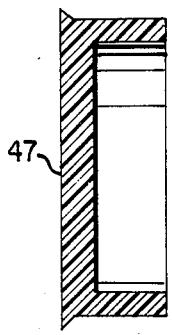
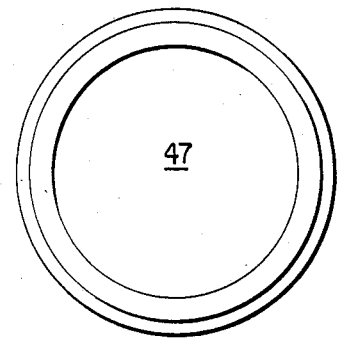
FIG. 10  FIG. 11
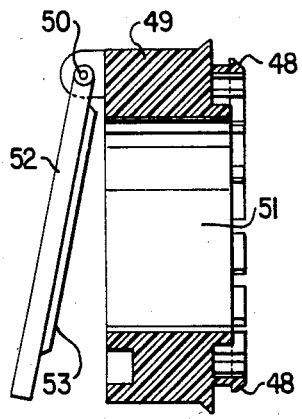
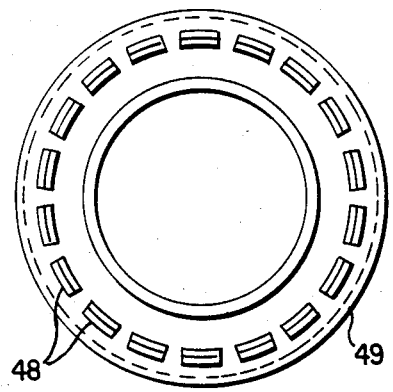
FIG. 12  FIG. 13
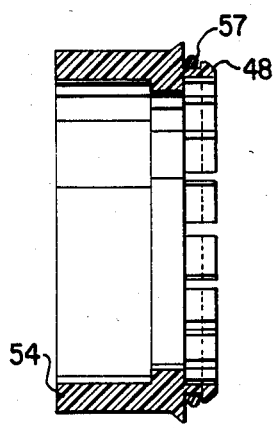
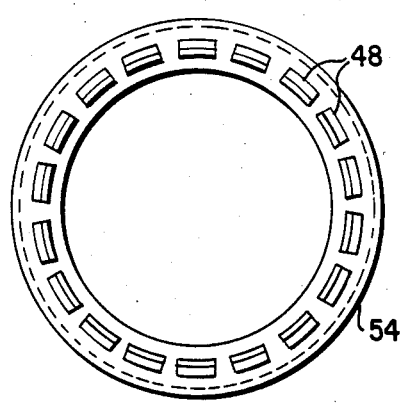
FIG. 14  FIG. 15

BUILT-IN VACUUM SYSTEM

FIELD OF THE INVENTION

This invention is directed to an improved built-in vacuum system. More particularly, this invention relates to a built-in vacuum system which has improved vacuum drawing capability, an improved filtering system, and an improved vacuum hook-up arrangement.

BACKGROUND OF THE INVENTION

In recent years, it has become common practice to construct new houses with built-in vacuum systems which are used to clean the floors, carpets, drapes, upholstery, etc. in the house. Inlet valves are located in the walls or floors in each location and are connected by vacuum pipes positioned to a central vacuum drawing canister which is powered with one or more suction motors. The canister is usually located in the garage or basement of the house. A long hose and cleaning attachment are carried by the person who is cleaning the house and is fitted into the inlet valve closest to the room to be cleaned. The vacuum system is turned on by placing the hose end into the inlet valve and the carpet and floors in the room are then vacuumed. The dust and dirt collected by the vacuum cleaning attachment is drawn by vacuum to the central canister by way of the piping and is filtered from the vacuum air stream by one or more filters contained in the canister. In present built-in vacuum systems, the filtering action is usually achieved by means of a cloth bag suspended in the canister. Positioned within the cloth bag there is usually a removable disposable internal paper bag. Other filtering mediums may be located between the bag and the motor(s) used to draw a vacuum by means of powered vacuum fans. One is an inexpensive poly foam filter. This filter is sometimes held suspended between the bags and the motors by layers of glued grass or straw. This construction of filter, while inexpensive, is not particularly durable or efficient.

The applicant is aware of a number of built-in vacuum systems which are available on the market. One system is manufactured by Husky Industries Ltd. and marketed under the number model G250. Another system is manufactured by Sequoia Vacuum Systems, Inc., Menlow Park, Calif. A widely selling system is manufactured by MD Manufacturing Company, Calif.

The built-in vacuum systems built by these companies suffer from one or more shortcomings. One system (Husky Industries Ltd.) utilizes only one motor for drawing the vacuum. Thus total drawing power is limited. All of the three identified systems lose vacuum cleaning capability as dust and lint levels build up in the canister. All of the identified systems are limited in the maximum vacuum they are capable of drawing (usually about 3 ins Hg) and hence are not as efficient as they could be. All of the identified systems have rather poorly fitting attachments and fittings, which cause leaks and vacuum levels to be lost throughout the system.

SUMMARY OF THE INVENTION

I have invented an improved vacuum drawing canister for a built-in vacuum system. The canister is so efficient that it is capable of filtering out very fine materials such as gypsum plaster without clogging the system. This is not possible with built-in vacuum systems presently available on the market. In my system, vacuum power and efficiency is maintained at a high level regardless of the level of dust and lint that is built up in the dust collecting system. Unlike current systems on the market, vacuum efficiency in my system does not drop in inverse ratio to the build up of dust and lint in the filter bag. My canister is also adapted to readily utilize one, two or three vacuum drawing motors, thereby enabling the canister to be used for three separate vacuum power capacity requirements. My canister design also features improved tightly fitting readily removable vacuum inlet fittings in the canister. My system also uses an improved air filtering system above the vacuum motor(s) in place of the present inexpensive glued straw/polyurethane foam filters now commonly used.

The invention is directed to a built-in vacuum apparatus comprising in combination: (a) container having therein at least one vacuum inlet port and one vacuum outlet port; (b) means for drawing a vacuum upon the vacuum inlet port, and exhausting drawn air through the vacuum outlet port; and (c) a particle filtering medium which is so disposed within the container that none of the effective filtering surface of the filtering medium contacts the container when a vacuum is drawn upon the system by the vacuum drawing means.

DRAWINGS

In the drawings:

FIG. 10 represents a side section view of a vacuum inlet plug;

FIG. 11 represents a front elevation view of the vacuum inlet plug illustrated in FIG. 10;

FIG. 12 represents a side section view of an inlet fitting with a closable gate;

FIG. 13 represents a front elevation view of the inlet fitting with the gate illustrated in FIG. 12;

FIG. 14 represents a side elevation view of a vacuum inlet fitting;

FIG. 15 represents a front elevation view of the vacuum inlet fitting illustrated in FIG. 14.

DETAILED DESCRIPTION OF ONE EMBODIMENT OF THE INVENTION

Figure 1:
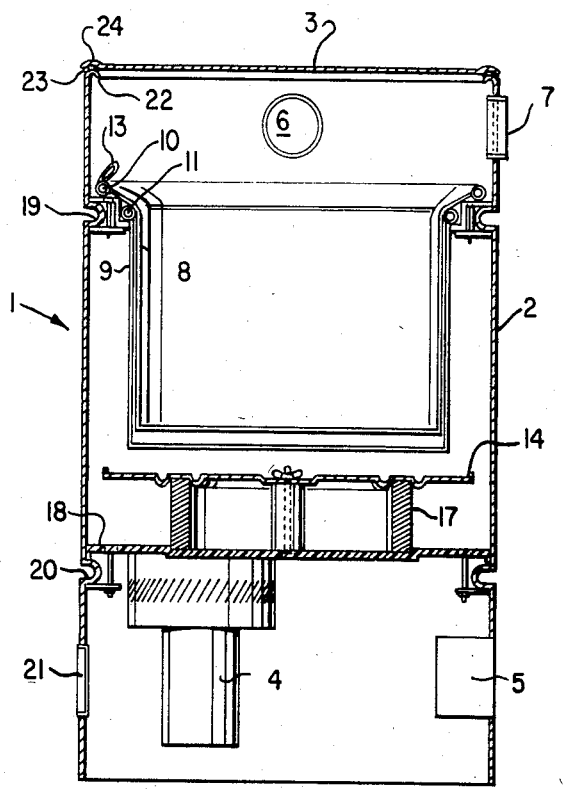
FIG. 1 represents a side, partly section, elevation view of the built-in vacuum canister.

Referring to FIG. 1, which represents a side, partly section, elevation view of the built-in vacuum canister 1, it can be seen that the canister 1 is constructed of a cylindrical canister body 2. The bottom has three holes for transmitting cooling air to the motors. A canister lid 3 fits on the top. A vacuum motor 4 and a transformer and relay 5 are mounted in the interior base region of the canister body 2. Positioned at the top portion of the canister body 2, at points around the circumference, are three vacuum inlets 6 and 7. A snap-in vacuum inlet fitting 54 is shown inserted in one of the inlets 6, while inlet 7 has therein a closable gate fitting.

Suspended within the interior of the upper region of the canister body 2, below the inlets 6 and 7, are a dust and lint filtering combination of an inner bag 8 and an outer bag 9. The inner bag 8 is typically constructed of a tightly woven nylon cloth. The outer bag 9 is typically constructed of woven duck cotton. The inner bag 8 is attached to and suspended from an inner bag hoop 10. The outer bag 9 is attached to and suspended from an outer bag hoop 11.

Figure 2:
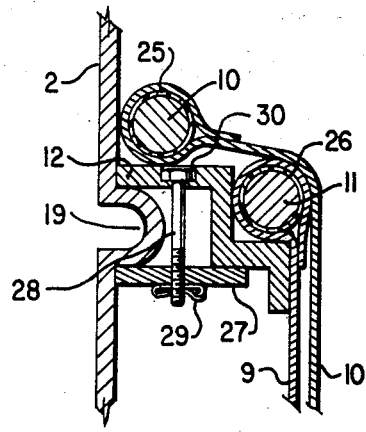
FIG. 2 represents a side elevation detailed section view of one part of the double bag suspension system.
Figure 3:
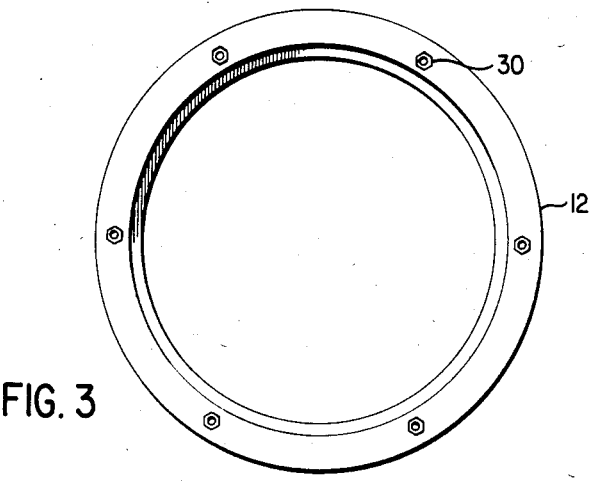
FIG. 3 represents a top elevation view of the double bag suspension support.

The manner in which the inner bag 8, the outer bag 9, the inner bag hoop 10, and the outer bag hoop 11, are assembled, and secured to the side of the canister body 2 is shown in detail in FIG. 2. The inner hoop 10 and the outer bag hoop 11 sit respectively on upper and lower steps of a hoop support 12. The hoop support 12 rests on an inwardly protruding bag support wall recess 19, which is formed around the circumference of the canister body 2. The hoop support 12 is held in place on the recess 19 by a series of retaining clips 27, which are spaced around the bottom edge of the circumference of the recess 19. The support 12 is held firmly down on the recess 19 by means of a series of retaining clip bolts 28, and retaining clip nuts 29. The heads of the bolts 28 fit in hexagonal shaped recesses 30 formed in the hoop support 12. These hexagonal shaped counter sunk recesses 30 are illustrated in FIG. 3, which illustrates a top elevation view of the hoop support 12. The hoop support 12 is formed from a suitable tough resilient injection molded plastic.

As can also be seen in FIG. 2, the inner bag 8 is attached to the inner bag hoop 10 by means of a sleeve sewn around the circumference of the top edge of the bag 8. The hoop 10 fits within the sleeve sewn in inner bag 8. The hoop 10 is coated with a resilient coating 25, such as neoprene, to provide a certain amount of give to the outer circumference of the hoop 10. In this way, when hoop 10, with its resilient coating 25, together with the sleeve of the bag 8, is fitted upon the hoop support 12, its outer circumference adapts to minor bends and warps and thus fits snugly against the circumference of the inner wall of the canister body 2. This ensures that there is at all points a tight air seal between the hoop 10 and the canister wall. Consequently any vacuum drawn upon the inner bag 8 from below will cause all of the air to flow through the bag, rather than being able to bypass it by means of passing through any openings which might be present if hoop 10 was not snugly fitted around the circumference of the inner wall of canister body 2.

Outer bag 9, as can be seen in FIG. 2, rests snugly and securely upon the lower step of hoop support 12. As with hoop 10, outer bag hoop 11 is coated with a resilient coating 26, such as neoprene. The hoop 11, with its coating 26, fits within a sleeve which is sewn around the circumference of the top of outer bag 9. Again, the resiliency provided by the coating 26, enables hoop 11, and the sleeve of bag 9, to fit snugly against the back riser of the lower step of hoop support 12. This provides a vacuum-tight seal, and thereby ensures that all air drawn through the inner bag 8, will also pass through outer bag 9, and not partially around it. Thus, the two snug fits ensure that no air can bypass either inner bag 8 or outer bag 9.

An air tight seal between lid 3, and the canister body 2, as seen in FIG. 1, is provided by means of a combination of a curled lip 22, which is rolled around the rim of the top of canister body 2, and a lid recess 24, which is formed around the circumference of the lid 3. A lid gasket 23, formed of flexible foam snugly upon top rim 22 of the canister body 2, thereby providing an air-tight seal. Vents 21 are formed in the circumference of the lower region of the canister body 2, in order to provide passage for exhaust air from the suction motors 4.

It can also be seen in FIG. 1, that an inner bag finger strap 13 is sewn to the sleeve of the inner bag 8. This enables the inner bag 8 to be easily removed from the interior of the canister body 2. Thus, for example, when the inner bag 8 has become filled with dust and lint collected by operating the built-in canister 1, it can be readily removed and the dust and lint disposed.

FIG. 1, also demonstrates that below the inner bag 8 and the outer bag 9, there is positioned a combination of a hold down plate 14, an air filter 17 positioned under the central area of plate 14, and a filter and motor support plate 18, positioned directly under the air filter 17. The construction of the hold down plate 14 is illustrated in FIG. 5. The hold down plate 14 is circular in shape, and has formed therein, for strength and functionality, a number of annularly arranged concentric grooves or ridges. While some of the rings provide strength, two of the rings are machined so as to provide a recess 16, in which is received the top rim of the circular air filter 17. A finger hole 15, is cut into one side of the plate 14, to enable the plate to be easily lifted from the interior of the canister 2. A central screw hole 31 is drilled in the centre of the plate 14. As seen in both FIG. 1 and FIG. 4, the lower support plate 18, rests upon a filter and motor support plate recess 20, which is formed in the circumference of the canister body 2. Hole 15 fits over bag support ring 12a to allow plate 14 to be removed from the canister.

Figure 4:
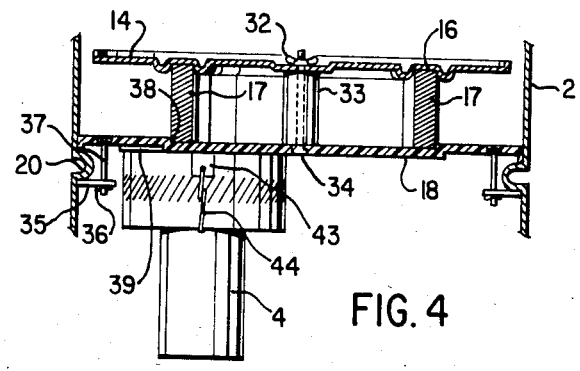
FIG. 4 represents a side section view of the air filter and vacuum motor suspension system.
Figure 5:
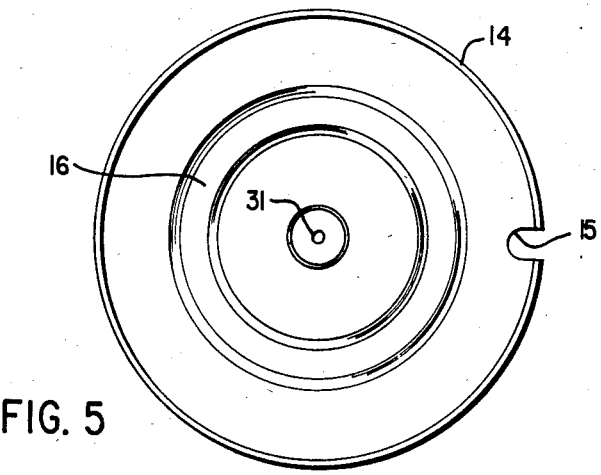
FIG. 5 represents a top elevation view of the top hold-down plate for the air filter.

FIG. 4 illustrates in detail the manner in which the hold down plate 14, the air filter 17, and the filter and motor support plate 18, are secured together, and also secured upon recess 20. The hold down plate 14, is held down by means of a hold down plate retaining post 33, which is secured at its upper end to plate 14 by wing nut 32, and at its lower end to support plate 18 of a counter sunk post 34. Air filter 17 at its upper rim, fits within recess 16 formed in plate 14. At its lower rim, air filter 17 abuts against a circular recess shoulder 38, formed in the support plate 18. Typically, hold down plate 14 can be constructed of stamped metal, such as steel or the like. Support plate 18 can be formed by injection moulding from a suitable strong dimensionally stable plastic.

The circumferential rim of support plate 18 rests upon recess 20 formed in the wall of the canister body 2. The rim of support plate 18 is held securely upon recess 20 by means of a series of hold down clips 35 which are spaced around the circumference of the recess 20. Likewise, a respective number of hold down clip bolts 37, and hold down nuts 36. Bolt heads 37 are counter sunk in hexagonal recesses formed at equally spaced locations around the edge region of support plate 18 co-operate with the clips 35 to grip the plate 18.

Figure 6:
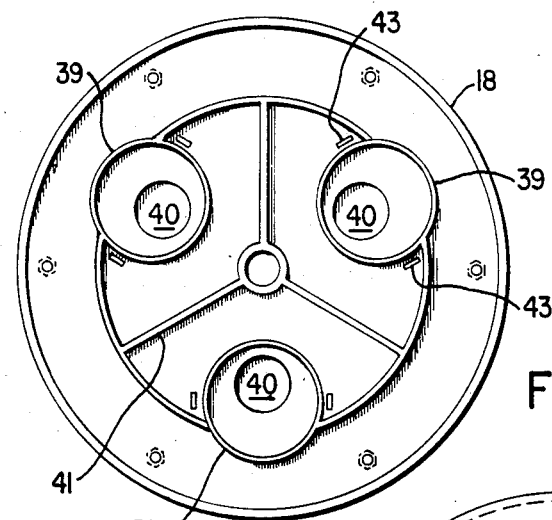
FIG. 6 represents a bottom elevation view of the air filter and vacuum motor support plate.
Figure 7:
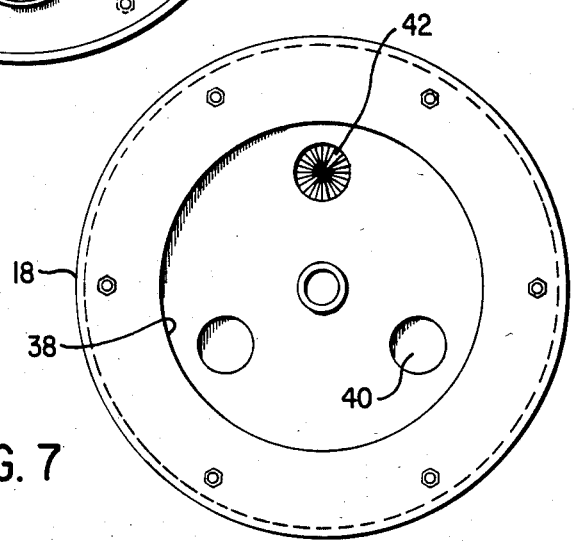
FIG. 7 represents a top elevation view of the air filter and vacuum motor support plate.

The construction of support plate 18 can be seen in more detail in FIGS. 6 and 7 respectively. FIG. 6, which represents a bottom elevation view of the support plate 18, illustrates the counter sunk holes for the hexagonal bolts 37 positioned around the circumference of the plate 18. Formed into the bottom surface of the plate 18 are three 120° spaced vacuum motor mounting plates 39, which are formed in the central region of the plate 18. The vacuum motor mounting plates 39 are circular in shape and are adapted to receive the suction face of a vacuum motor 4 (see FIGS. 1 and 4). In the central area of each motor support plate 39, are circular knock-out vacuum ports 40. One or more of these ports can be punched out in order to receive the suction inlet of a respective vacuum motor 4.

Depending upon the suction requirements of the home or building in which the built-in vacuum system will be installed and used, the support plate 18 is fitted to receive one, two, or three vacuum motors 4. Usually, each vacuum motor 4 is of a power size falling within the range of 1.3 to 1.75 horsepower. This is because the electrical circuit supplying power to the built-in vacuum 1 is generally of 110 AC 15 amp. capacity. However, with my system, it is possible by using 15 amp., 20 amp., or 30 amp. circuits, as required, to increase the power capacity from one vacuum motor 4 to either two or three vacuum motors, each of 1.2 to 1.75 horsepower capacity. Thus, my system can utilize up to 5.25 horsepower of vacuum motor capacity, which is greater than any system now on the market, and of ample vacuum capacity for any general application. Conceivably, four or five vacuum motors 4 could be installed in my canister, but this normally would not be necessary. Support plate 18 would be redesigned to receive four or five motors 4.

Also formed into the under side of the support plate 18, are three reinforcing ribs 41, extending from the centre of the plate to the circumferential region of the plate 18, and spaced radially 120° from each other. Also formed at six locations on the underside of plate 18, in pairs on either side of each motor mounting plate 39, are six hold down tabs 43. These are utilized for readily securing the vacuum inlets sides of one or more vacuum motors 4 into position against the motor mounting plates 39. As seen in FIG. 7, one of the vacuum port holes 40 has been knocked out and a perforated air grate 42 has been inserted into the opening. The purpose of this grate 42 is to prevent the grass and foam filters being sucked into the fan chamber. Grate 42 is only necessary when an economy model employing a destructible type of filter is used.

Figure 8:
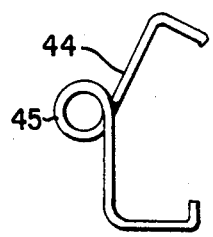
FIG. 8 represents a side elevation view of the vacuum motor suspension spring.
Figure 9:
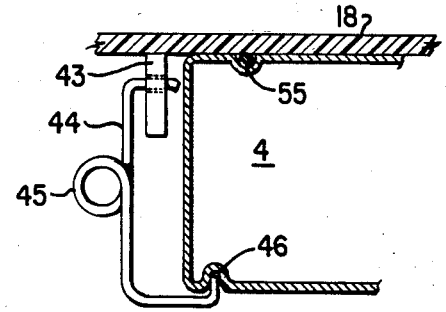
FIG. 9 represents a side elevation view of the manner in which the suspension spring suspends the vacuum motor from the air filter and vacuum motor support plate.

The manner in which each vacuum motor 4 is secured to a pair of hold down tabs 43 is illustrated in detail in FIGS. 4, 8 and 9. As seen in FIG. 4, the vacuum side of vacuum motor 4 fits snugly against the underside of mounting plate 39. A suitable diameter O-ring can be fitted between the vacuum motor 4 and the mounting plate 39, to ensure that a full vacuum seal is achieved. To assist in holding the O-ring in place, a circular O-ring retaining groove around the edge of the plate 39 can be included. The vacuum motor 4 is held in place by means of a pair of motor retaining clips 44 which connect respectively the pair of tabs 43 and at two points the shoulder of the motor 4. One tab 43 and one spring 44 are visible in FIG. 4, the other tab 43 and spring 44 are on the other side of motor 4.

The construction of clips 44 is shown in detail in FIG. 8. The clip 44 has a built-in spring capacity as provided by spring 45. Thus, when the clip 44 is extended, as seen in FIG. 9, the spring 45 applies a positive compression force in the clip 44, thereby ensuring that it securely holds the motor 4 in place. One end of the clip 44 fits in a hole in the hold down tab 43, formed in the support plate 18. The other end of the clip 44, fits in a recess 46 formed in the shoulder of the housing of vacuum motor 4. To improve sealing action, O-ring 55 is shown in place between plate 18 and motor 4. In practice, it has been found that two clips 44 are sufficient to hold the vacuum motor 4 securely against the mounting plate 39. However, if required, more clips 44 and tabs 43 can be used.

FIGS. 12 and 13, and FIGS. 14 and 15, illustrate respectively two types of snap in fittings which can be utilized in the vacuum inlets 6 which are located in the upper region of the canister body 2. FIGS. 14 and 15, illustrate in side and front elevation views respectively, an inlet fitting 54, which has a number of grip teeth 48, arranged in a circular spaced pattern around one face of the fitting 54. These grip teeth 48, are formed to provide a catch point, and in combination with one another, snap into and grip the circumferential rim of the inlet 6 of the canister 2. Inlet fitting 54 is utilized on either side of the canister. To enhance sealing action, an O-ring 57 fits behind the teeth 48.

FIGS. 12 and 13 illustrate respectively side and front elevation views of a gate inlet fitting 49, which is also equipped with a plurality of grip teeth 48. Fitting 49 is inserted in an inlet 6 when it is desired to have the inlet 6 capable of being opened or closed. This can be done by raising gate 52. When gate 52 is lifted, a vacuum line, or the like, can be inserted through the suction opening 51 formed in the interior of the fitting 49. The gate 52 is fitted with a small O-ring 53, in order to provide a tight seal between the gate 52 and the edge of the main body of the fitting 49 when the gate 52 is closed. Hinge 50 can be spring loaded in order to ensure that the gate 52 closes tightly when not lifted. To further improve sealing action, O-ring 56 fits behind teeth 48. The inlet goes in the centre hole 7 of the canister 2.

FIGS. 10 and 11 respectively illustrate side and front elevation views of a standard inlet fitting plug 47. It is used to plug off the central opening of inlet fitting 54, or fitting 49, when either opening into the canister is not required in the installation. Fitting 54, without a plug 47, is normally used in situations where a permanent vacuum tube passes into the interior of the canister body 2. For example, the main suction line from various points in the building into the canister body 2 would utilize fitting 54.

A major advantage of my construction of built-in vacuum 1 is that it utilizes three filter mediums, namely, the inner bag 8 formed of woven nylon cloth, the outer bag 9 formed of duck cotton material, and the circular air filter 17. Thus, when the suction motor 4, or two or three of them as the case may be, is turned on, a strong vacuum is drawn through inlet ports 6, as required. The air drawn in through these inlets 6 is first passed through inner bag 8, then through outer bag 9, and finally through filter 17, before being exhausted from the bottom interior of the canister body 2. With the triple vacuum motor 4 capacity, and the triple filter arrangement, I have found that my built-in vacuum design is capable of filtering completely finely ground gypsum plaster dust, and the like, from the air drawn in through inlet 6. No other built-in vacuum system that I know of on the market today is capable of doing this.

Another major advantage of my built-in vacuum system is that by having the inner bag 8, and the outer bag 9, suspended within the canister body, with the sides of the bags away from the walls of the canister body 2, the entire surface area of the inner bag 8, and the outer bag 9 is utilized in providing a filtering action. In present built-in vacuum systems on the market, the walls of the filtering bags are against the walls of the canister, or are sucked against the internal walls of the canister body by vacuum and hence, only a portion of the total surface area of the filtering bags is utilized for filtering purposes. Moreover, once the filtered dust and lint reaches a certain level at the bottom of the filtering bags in systems now available on the market, the vacuum drawing ability of the system is curtailed. With my system, since two to three times the total surface area of the filtering bags remains in efficient operation, two to three times the volume of dust and lint can be collected, before there is any significant drop in vacuum drawing ability.

As an option, in my system, a third paper bag filter can be fit into the space within inner bag 8. Typically, the paper bag is completely enclosed except for two small openings which are adapted to be received in inlets 6 and 7 of the canister 2. When the paper bag has been filled with collected dust and lint, it can be detached from the respective inlet openings 6 and 7 and discarded.

The use of a circular air filter 17, in the lower region of the interior of the canister body 2, provides the capability of filtering even the finest lint and dust from the air. This is a considerable improvement over filtering systems which are now used in built-in vacuum apparatus available on the market. In present systems, the filtering medium directly overlies the inlet part of the vacuum motor and is constructed of a cheap combination of glued grass or straw, and flexible polyurethane foam. If a less expensive model of my built-in vacuum system 1 is required, for example, for sale in budget discount stores, then the air filter 17 can be replaced with a simpled glued grass-flexible polyurethane foam filter, and the inner nylon bag 8, can be replaced with a cheap paper bag. However, other novel features of my built-in vacuum system would be retained.

Figure 16:
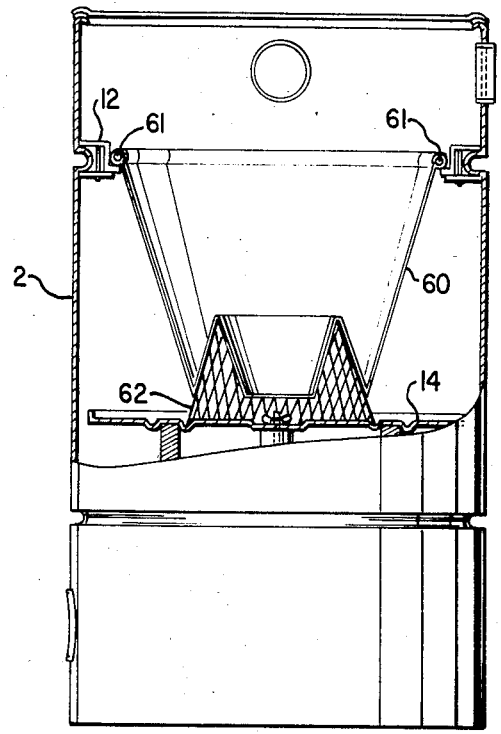
FIG. 16 represents a side, partly section, elevation view of an alternative bag system for the built-in vacuum canister.
Figure 17:
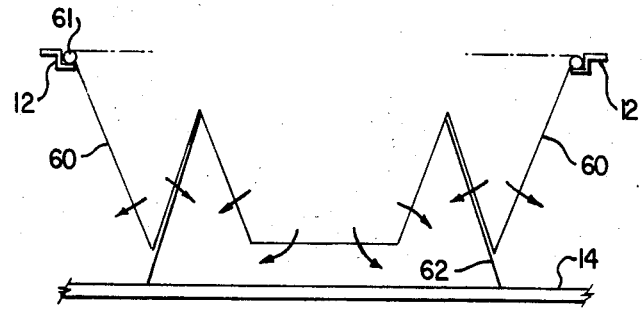
FIG. 17 represents an enlarged, partly section, front elevation view of the alternative bag system.
Figure 18:
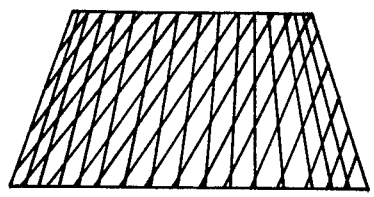
FIG. 18 represents a side elevation view of the basket used to suspend part of the bag for the alternative bag system.

FIG. 16 illustrates an alternative bag suspension system which can be used in my built-in vacuum system. As can be seen in FIG. 16, a bag 60 shaped in the form of an elongated cone, with a truncated end, can be suspended from the inner hoop support 12 by means of hoop 61. When bag 60 is used, neither inner bag 8 nor outer bag 9 is used. Bag 60 is normally constructed of tightly woven nylon cloth to provide effective filtering action. The bag 60 is, in effect, tri-folded so as to form in effect three truncated conical filtering surfaces. The direction of air filtration through each surface is illustrated by means of arrows on FIG. 17. The shape of the inner conical surfaces is maintained by a basket 62 which rests on the hold down plate 14 (FIG. 17). FIG. 18 illustrates the construction of the basket 62. It is constructed in the shape of a hollow truncated cone with a porous side wall, and circular openings at the top and bottom. Bag 60 and basket 62 are used as an effective alternative to inner bag 8 and outer bag 9, when a less expensive built-in vacuum system is required.

The foregoing discussion is to be considered only as a specific description of the invention and the applicant does not intend thereby to be restricted to the specific description. It is to be understood that other non-inventive embodiments and alternative designs of the invention are possible and these are to be considered as follows within the scope of the claims to the invention.

The embodiments of the invention in which an exclusive property of privilege is claimed are defined as follows:

1. A built-in vacuum apparatus comprising in combination:
   (a) a hollow container having in the walls thereof at least one air vacuum inlet prot and one air vacuum outlet port;
   (b) air vacuum drawing means communicating with the inlet port and the outlet port for drawing a vacuum upon the vacuum inlet port, and exhausting drawn air through the vacuum outlet port;
   (c) a first hollow open ended particle filtering medium which is open at one end and closed at the opposite end and is disposed within the container between the inlet port and the vacuum drawing means, the open end of the filtering medium facing in the direction of the inlet means, the filtering means being connected by a filtering means suspension means in an airtight manner with the side walls of the container;
   (d) a second hollow open ended particle filtering medium which is open at one end and closed at the opposite end and is of slightly smaller dimensions than the first filtering medium, fits within the interior of the first filtering medium and has its open end facing in the same direction as the open end of the first filtering medium, the first and second particle filtering mediums being so positioned within the container by the filtering means suspension means that none of the effective filtering surface of the first and second filtering mediums contacts the walls of the container when a vacuum is draw upon the system by the vacuum drawing means; and
   (e) a hollow cylindrically shaped air filter open at one end and closed at the opposite end which is positioned within the interior of the container between the first and second filter mediums, and the vacuum drawing means, the open end facing in the direction of the vacuum drawing means, and air passes from the exterior of the filter mediums into the interior of the air filter through the sidewall of the filter before being drawn by the vacuum drawing means through the outlet port.

2. A built-in vacuum apparatus as defined in claim 1 comprising
   a vacuum drawing means support means positioned in the interior of the container, between the end of the first filter means opposite the open end of the first filter means outlet port, and the support means having affixed to the underside thereof one or more of said vacuum drawing means.

3. A built-in vacuum apparatus as defined in claim 2 wherein the walls of the container are circular and the means for suspending the first second filter mediums within the container is a circular rim which rests on suspension means affixed to the walls of the container and which extends around the internal circumference of the walls of the container, the rim having thereon means for gripping the circumferences of the openings of the first and second filter mediums and suspending the first and second filter mediums in an annular relationship from respective concentric locations at the interior region of the circular rim, the circular rim being adapted to hold the walls and bottom of the second filtering medium away from the walls and bottom of the first filtering medium.

4. A built-in vacuum apparatus as defined in claim 1 wherein the air filter rests upon a support means, the underside of which carries the vacuum drawing means.

5. A built-in vacuum apparatus as defined in claim 4 wherein the air filter is held in place by a filter holding means secured to the support means.

6. A built-in vacuum apparatus as defined in claim 2 wherein the vacuum drawing means is held in position on the support means by detachable clips.

7. A built-in vacuum apparatus as defined in claim 6 wherein the vacuum inlet port into the interior of the container is fitted with a detachable snap-in fitting which is adapted to receive a vacuum line.

8. A built-in vacuum apparatus as defined in claim 7 wherein the detachable fitting snaps in place in the inlet port by means of two or more resilient teeth which grip the container.

9. A built-in vacuum apparatus as defined in claim 8 wherein the fitting is equipped with an air-tight gate which can be moved between a closed position and an opened position.

10. A built-in vacuum apparatus as defined in claim 9 wherein a plug fits in the opening of the fitting to plug the inlet opening.

11. A built-in vacuum apparatus as defined in claim 10 wherein the fitting has an orifice therein for enabling air to pass into the interior of the container.

12. A built-in vacuum apparatus as defined in claim 11 wherein the support means is in the form of a disk the plane of which is disposed radially in the interior of the apparatus and has formed therein one or more locations adapted to receive and secure respectively one or more vacuum drawing means.

13. A built-in vacuum apparatus as defined in claim 12 wherein the one or more vacuum drawing means receiving and securing locations in the disk have formed therein one or more knock-out openings for receiving and securing the respective vacuum inlet orifice of one or more corresponding vacuum drawing means.

* * * * *